(No Model.)
A. D. BERGTOLD & F. P. VAN DENBERGH.
FLOUR.
No. 548,424. Patented Oct. 22, 1895.
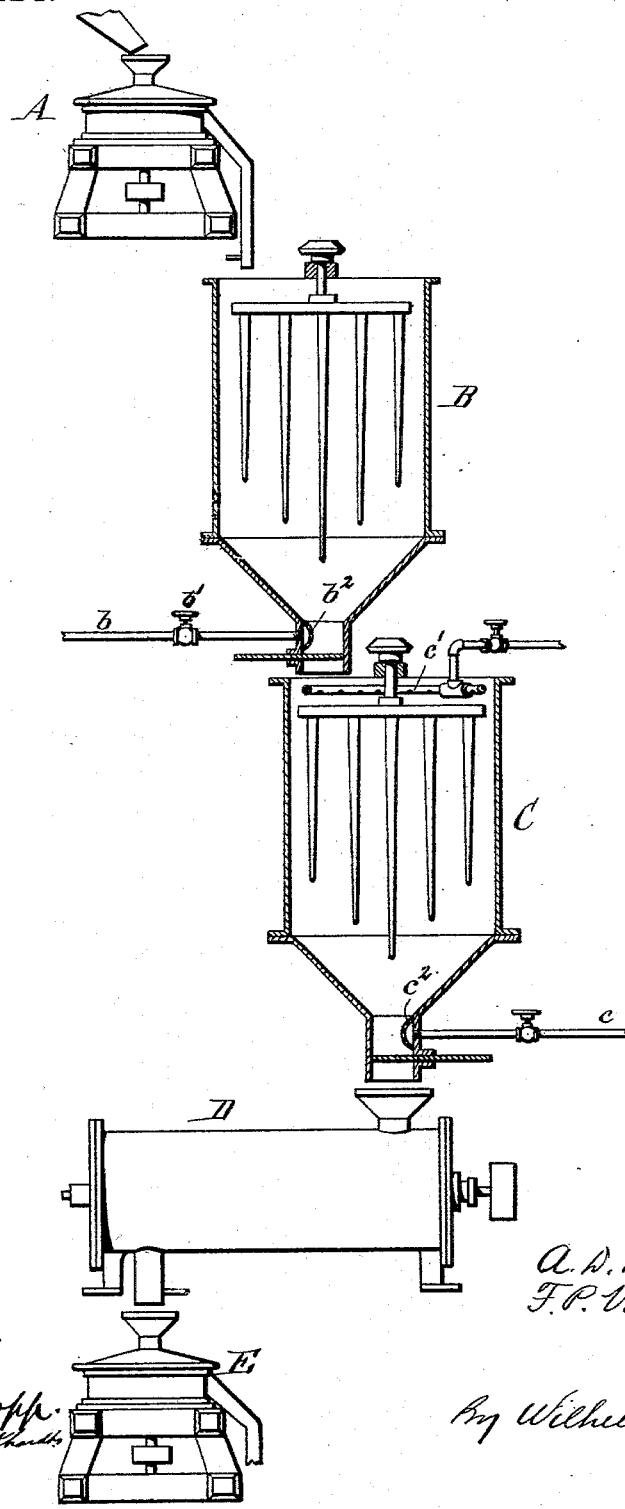
Witnesses:
Theo. L. Popp.
Chas. F. Burkhardt
A. D. Bergtold
F. P. Van Denbergh.
Inventors
By Wilhelm Bonner
Attorneys

UNITED STATES PATENT OFFICE.

AUGUSTUS D. BERGTOLD AND FRANK P. VAN DENBERGH, OF BUFFALO, NEW YORK; SAID VAN DENBERGH ASSIGNOR TO SAID BERGTOLD; SAID BERGTOLD ASSIGNOR OF TWO-THIRDS TO ISIDOR H. FALK AND SOLOMON B. GEISMER, OF SAME PLACE.

FLOUR.

SPECIFICATION forming part of Letters Patent No. 548,424, dated October 22, 1895.

Application filed April 2, 1895. Serial No. 544,139. (No specimens.)

*To all whom it may concern:*

Be it known that we, AUGUSTUS D. BERGTOLD and FRANK P. VAN DENBERGH, citizens of the United States, residing at the city of Buffalo, in the county of Erie and State of New York, have invented a new and useful Improvement in Flour, of which the following is a specification.

Our invention has for its object to produce a highly nutritious flour at a comparatively low cost; and it consists, essentially, of flour made of reduced beans and containing the desirable ingredients of the beans, but deprived of those parts of their albuminous constituents that give to the bean its peculiar taste and yield on decomposition sulphureted hydrogen and other gases likely to produce nausea and discomfort.

The accompanying drawing represents a sectional elevation of an apparatus which may be employed in manufacturing our improved bean flour.

In producing the flour a batch of ordinary dry beans is reduced in any suitable grinding or reduction machine A to about the size of split peas.

B is a steep-tank which receives the reduced beans from the grinding-mill. This tank contains an alkaline solution composed, preferably, of ninety-five parts of water and five parts of soda, in which solution the reduced beans are steeped for a period of about twenty-four hours. The mixture is stirred a number of times during the day—say about twice—and allowed to settle after each agitation and over night. The alkaline solution loosens and detaches the sheaths or hulls from the bodies of the beans and removes the legumin, conglutin, and gluten-casein contained in the bean substance, partly by solution or leaching and by decomposing said substances more or less completely. These ingredients constitute the particular kind of plant, cheese, or vegetable casein which gives to the bean its characteristic taste and which is objectionable in bean flour. The composition of vegetable albuminoids is not yet sufficiently well known to express by chemical formula the reaction taking place between the objectionable albuminoids and the alkaline liquid; but the products of decomposition may be stated in general to be ammonia, carbon dioxide, and the several vegetable acids—glucic, mucic, aspacic, &c.—derived from the albuminoids. The alkali dissolves also a portion of the gluten-fibrin, gliadin, and mucedin contained in the crude gluten, but not in sufficient quantity to materially impair its nutritive value, while the phosphates, together with a large proportion of the gluten, gluten-fibrin, and other albuminoids and nearly all the starch, remain in the beans.

The detached hulls of the beans rise to the surface of the liquid in the steep-tank and are skimmed off after each settling, while the heavier bean substance settles to the bottom of the tank. The alkaline solution, with the accompanying objectionable albuminoids above mentioned, is next drawn from the tank through a pipe $b$, having a cock $b'$ and a strainer $b^2$ for intercepting the solid material. The remaining bean substance is delivered into a tank C containing a suitable neutralizing agent or solution whereby the alkali in the bean substance is neutralized. A solution composed of one part of hydrochloric acid and ninety-nine parts of water has been found satisfactory for this purpose. This mixture is frequently stirred and the bean substance allowed to remain in the solution until the alkali contained therein is entirely neutralized, this being determined by the use of phenol-phthalein or by any other suitable test. The liquid is then drawn off through a pipe $c$ and the bean substance washed with water for removing any adhering impurities by means of spray-pipes $c'$, arranged in the upper portion of the tank, the water being allowed to flow freely through the outlet-pipe $c$ of the tank and the solid substance being intercepted by a strainer $c^2$ arranged over the inner end of said pipe.

D is a suitable drying apparatus which receives the purified bean substance from the neutralizing-tank and whereby the material is dried. The drying of the material is preferably effected at a temperature not exceeding 215° Fahrenheit, so as to avoid scorching the starch contained in the bean substance and prevent conversion of the starch into glucose. After drying the material the same is conducted to a suitable grinding or crushing mill E, whereby it is reduced to flour.

Compared with other flours—such as wheat flour, cornmeal, and oatmeal—our improved bean flour is much more nutritious, and its cost, considering its comparatively high nutritive value, is smaller, as the bean flour is about one-half richer in flesh-forming material than wheat flour and cornmeal and about one-third richer than oatmeal, while containing almost as large a percentage of fats or fuel-forming substances as any of the vegetable foods—such as oatmeal, cornmeal, or rice. There is also less waste or refuse in beans, all parts of the same being either flesh-forming or fuel-producing substances. The eliminated albuminoids can be recovered by condensation from the alkaline and neutralizing solutions and can be sold as a superior animal food and as a fertilizer, thus further reducing the cost of manufacturing the flour.

As the objectionable albuminoids are eliminated from the beans, the use of the flour is unattended with the nausea and discomfort which are liable to result from the presence of such albuminoids.

We claim as our invention—

1. The herein described bean flour, consisting of starch, gluten and the inherent phosphates and albuminoids of beans uncombined with legumin, conglutin and gluten casein, substantially as set forth.

2. The herein described method of producing flour from beans, which consists in disintegrating or coarsely reducing the whole beans, steeping the beans, directly after reduction, in an alkaline solution whereby the hulls are detached and the legumin, conglutin and gluten casein are extracted from the bodies of the beans, separating the remaining portions of the bodies from the hulls and solution, neutralizing the alkali remaining in the bodies, drying the bodies and finally reducing the same to flour, substantially as set forth.

Witness our hands this 26th day of March, 1895.

AUGUSTUS D. BERGTOLD.
FRANK P. VAN DENBERGH.

Witnesses:
CARL F. GEYER,
ELLA R. DEAN.